Feb. 2, 1943. H. J. MURPHY 2,309,737
ROTARY OPERATIVE FASTENER DEVICE AND INSTALLATION OF THE SAME
Filed June 25, 1941 3 Sheets-Sheet 1

Inventor:
Howard J. Murphy.
by John Todd
Atty.

Feb. 2, 1943. H. J. MURPHY 2,309,737
ROTARY OPERATIVE FASTENER DEVICE AND INSTALLATION OF THE SAME
Filed June 25, 1941 3 Sheets-Sheet 2
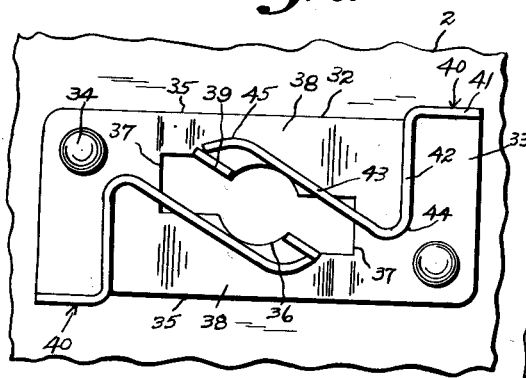
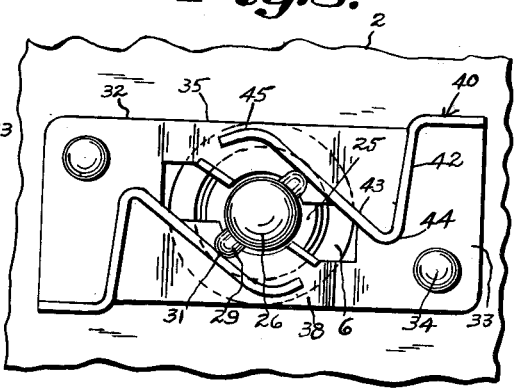
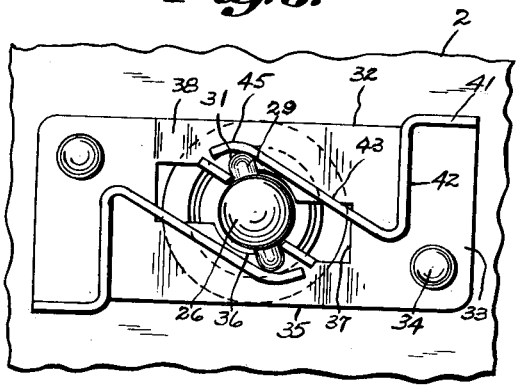
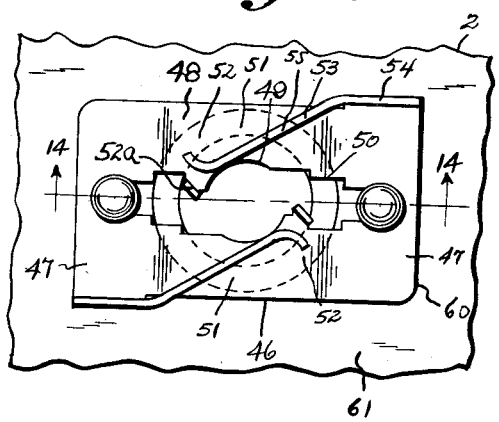
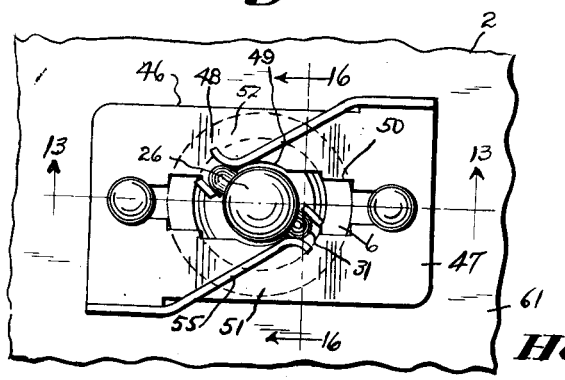
Inventor:
Howard J. Murphy
by John Todd
Att'y.

Feb. 2, 1943.   H. J. MURPHY   2,309,737
ROTARY OPERATIVE FASTENER DEVICE AND INSTALLATION OF THE SAME
Filed June 25, 1941   3 Sheets-Sheet 3

Inventor:
Howard J. Murphy,
By John Todd
Att'y.

Patented Feb. 2, 1943

2,309,737

UNITED STATES PATENT OFFICE 2,309,737

ROTARY OPERATIVE FASTENER DEVICE AND INSTALLATION OF THE SAME

Howard J. Murphy, Greenwood, Mass., assignor to United-Carr Fastener Corporation, Cambridge, Mass., a corporation of Massachusetts Application June 25, 1941, Serial No. 399,759

6 Claims. (Cl. 24—221)

This invention aims to provide improvements in fastener devices for securing together two or more members, preferably plate-like, the devices being of the so-called rotary operative type and adapted to draw the plates together on rotation of one part of the device relative to the other.

The chief object of my invention is the provision of a fastener device of simple construction having a socket member of generally rigid form and cooperating with a stud member in a manner to draw the parts to be secured firmly together. The socket member is designed particularly to effect a rigid support for a lateral projection of the stud member and integral spring means to hold the projection in locking engagement with the socket member. As a result of my improved construction wherein the pin of the stud member is supported by a rigid portion, it is impossible for the plates when secured together to move apart flatwise when subjected to forces tending to cause such action. In this regard it may be mentioned that fastener devices, known in the art, which include a flexible or yieldable socket member are not wholly satisfactory for use on high speed airplanes as the socket members by their inherent nature are so flexible that under certain conditions they permit one of the secured members to move away from the other.

Other uses and objects of my invention will be apparent from the drawings and specification below set forth.

In the drawings, which illustrate preferred embodiments of my invention:

Fig. 7 is a top view of a second form of socket member secured to a supporting plate;

Fig. 8 is a view similar to Fig. 7 and showing a stud member arrested part way between unfastened and fastened position;

Fig. 9 is a view similar to Fig. 8 and showing the stud member in fastened position;

Fig. 10 is a top plan view of my third form of socket member secured to a supporting plate;

Fig. 11 is a view similar to Fig. 10 and showing a stud member in fastened engagement with the socket member;

Figure 1:
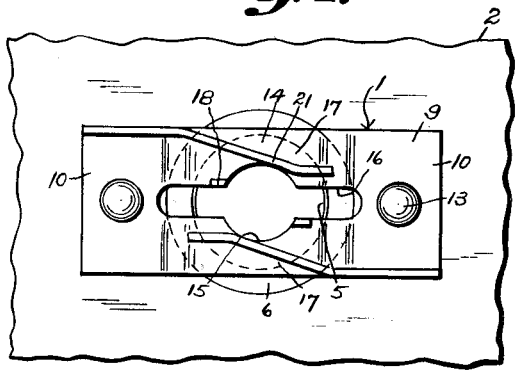
Fig. 1 is a top plan view of my first form of socket member secured in assembly with a supporting plate.
Figure 2:
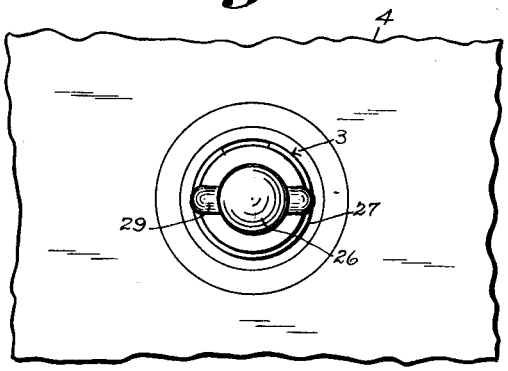
Fig. 2 is a view showing the stud member preferably used in cooperation with the several forms of socket member herein described.
Figure 3:
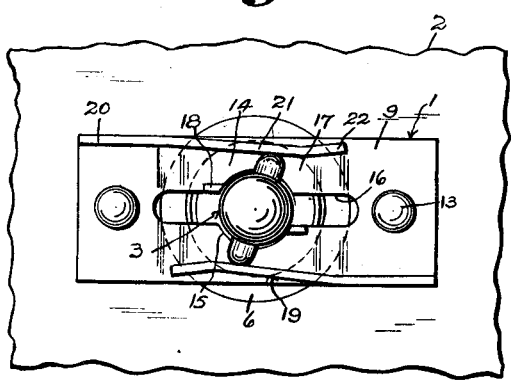
Fig. 3 is a view similar to Fig. 1 and showing the stud member arrested part way between unfastened and fastened position.
Figure 4:
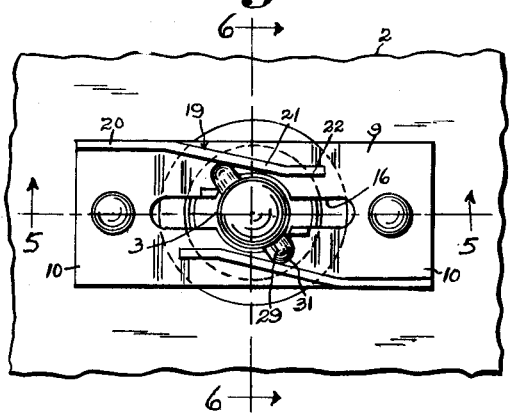
Fig. 4 is a view similar to Fig. 3 but showing the stud member in fastened position.
Figure 5:
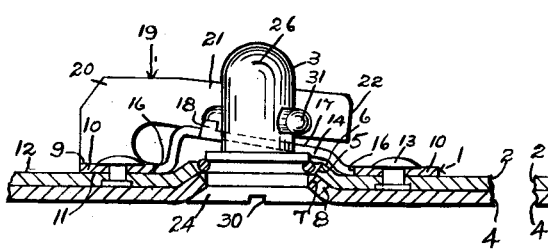
Fig. 5 is a section taken on the line 5—5 of Fig. 4.
Figure 6:
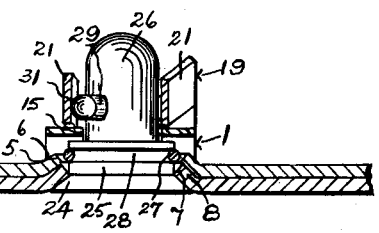
Fig. 6 is a section taken along the line 6—6 of Fig. 4.
Figure 12:
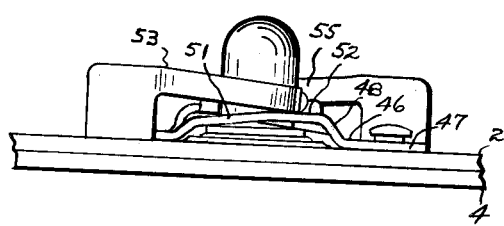
Fig. 12 is a side elevation of the installation shown in Fig. 11.
Figure 13:
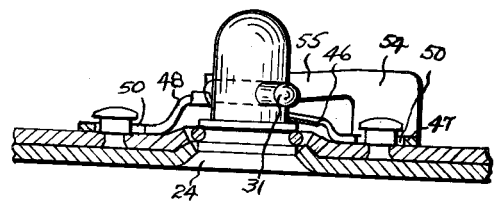
Fig. 13 is a section taken along the line 13—13 of Fig. 11.
Figure 14:
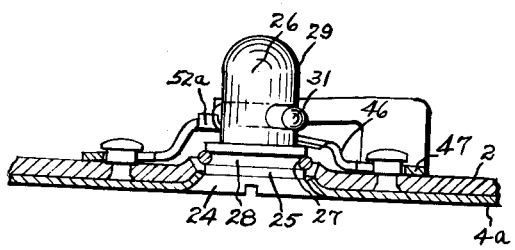
Fig. 14 is a section taken along the line 14—14 of Fig. 10 and showing the normal relation between the socket member and its supporting plate.

Referring to my first form of fastener device, illustrated in Figs. 1-6, the device comprises two units, one of which I shall term a socket or plate unit and the other of which I shall term a rotary unit. The socket unit 1 is secured on one side of a flat supporting plate 2 and the rotary unit 3 (Fig. 2) is secured on one side of a flat supporting plate 4. The plate 2, in my preferred installation, has an aperture 5 surrounded by a frustro-conical embossment 6 and the plate 4 has an opening 7 (Fig. 6) through which the rotary member projects. The opening 7 is preferably surrounded by a frustro-conical embossment 8 so that the plate 4 may present a flush outer surface when the rotary unit is finally assembled with the same. It will be seen that the embossment 8 of plate 4 is constructed to be disposed in and complementary to the embossment 6 of plate 2, to enable the plates 2 and 4 to be secured with their facing surfaces in abutting engagement.

My first form of socket member 1 is formed from one piece of metal and provides an elongated plate-like element 9. The element 9 has feet or end portions 10—10 at opposed longitudinal ends disposed in the same plane so that the lower flat surfaces 11 (Fig. 5) thereof lie flush with the inner surface 12 of the supporting plate 2 when the socket member is secured in assembly with the plate. The socket member is preferably secured to the plate by means of rivets 13 which project through the end portions 10 and are headed over on the outer sides of the socket member and plate. The fastener member has a raised portion 14 intermediate the ends 10—10 which has a central opening 15 and slots 16 in the form of narrow elongations of the central opening and extending on opposite sides of the same. The raised element 14 has inclined or locking surfaces 17—17 on opposite sides of the opening 15 extending from a low point adjacent the end of one of the slots 16 to a high point near the end of the other slot. Stop portions in the form of ears 18 extend upwardly from the raised element 14 adjacent the high points of the inclined surfaces. Locking means for engagement with the stud unit to assist in drawing the parts to be secured together are formed as an integral part of the fastener. The locking means comprises a pair of yieldable arms 19—19 which are integrally joined to the plate element and disposed in superposed relation to the plate element with the planes of their flat sides preferably normal to the general plane of the plate element. Each of the arms 19 has an attaching portion 20 (Fig. 5) at one end and the attaching portions are integrally joined to the plate element at diagonally opposite points on the longitudinal sides of the same. Spring portions 21 extend from the attaching portions each of which projects from the respective longitudinal side edge toward the central aperture 15 of the plate element and past the same. Each of the spring portions has a free end portion 22 extending at a slight angle to the normal direction of the spring portion.

The rotary unit 3 comprises a head portion 24, which is larger in diameter than the opening 7 of the panel 4, and a shank having a base portion 25 (Fig. 6) which is slightly smaller in diameter than the aperture 7. The shank has a nose 26 (Figs. 5 and 6) which is adapted to extend through the opening 15 of the plate element 9. The rotary unit is preferably secured in assembly with the plate 4 by a split ring 27 (Fig. 6) which is snapped into a groove 28 of the base 25. A pin 29 is driven or otherwise secured in an aperture of the nose 26 so that opposite ends of the pin extend laterally beyond the shank on opposite sides thereof in a direction transverse to the normal axis of the shank. The head 24 preferably has a slot 30 (Fig. 5) to receive a tool or suitable implement by which the unit may be rotated.

In fastening the plate 4 to the plate 2 the plates are brought into a superposed relation with the aperture 7 in alignment with the aperture 5. The opening 15 of the socket member is in alignment with the apertures 5 and 7 and the nose 26 of the shank passes through the opening 15 with the pin 29 in registration with the slots 16 of the plate element. Thereafter the rotary member is turned in a counter-clockwise direction viewing Figs. 3 and 4, causing the pin to ride up the inclined surfaces 17, at the same time drawing the plate 4 tightly against the plate 2. At the beginning of this action the pin ends 31 engage the spring portions 21 forcing the same away from each other against their normal spring tension, as most clearly shown in Fig. 3. The portions 21 pivot from their points of junction with the respective attaching portions 20 and as soon as the pin ends have passed those points at which the spring portions have maximum expansion the spring portions tend to resume their normal position and engage the pin ends to force the same against the inclined surfaces, as most clearly shown in Fig. 4. The spring portions 21 exert a constant tension on the pin ends in preferred operation of the fastener so as to prevent the same from moving in a reverse direction and thereby allow the parts of the assembly to loosen. As a result of my improved construction the pin ends are supported entirely by the plate element 9, which is rigid against any forces tending to move the plates flatwise away from each other. The stops 18 operate to prevent the rotary unit from being turned too far during the fastening operation.

My second socket member illustrated in Figs. 7, 8 and 9 is similar to my first form, but embodies certain changes intended to increase the flexibility of the spring arms. My second form of socket member is a one-piece device and includes a plate element 32 having end portions 33 secured in engagement with the panel 2 by rivets 34. The plate element has a raised element 35 intermediate the end portions having a central opening 36 (Fig. 7) and slots 37 extending laterally on opposed sides of the central opening and diagonally in relation to the plate element. The raised element 32 has inclined surfaces 38 which are similar in form to the inclined surfaces 17 of my first form and carry out an equivalent function. Ears 39 (Fig. 7) project upwardly from the raised element 35 near the high points of the inclined surfaces and act as stops. My second form of socket member differs chiefly from my first form in the construction of the locking arms 40—40. Each of the locking arms 40 has an attaching portion 41 at one end and the portions 41 are integrally joined to opposed longitudinal marginal edges of the plate element 32 adjacent the end portions 33. Each arm 40 is disposed in superposed relation to the plate element with the planes of its flat sides in perpendicular relation to the general plane of the plate element. Each arm has a yieldable portion 42 extending a predetermined distance in a plane substantially normal to the longitudinal sides of the element. A reverse-bend portion 43 forms a continuation of the portion 42 and provides a loop 44 at the junction. The reverse-bend portion 43 extends generally parallel to a diagonal of the plate element and normally substantially tangent to the opening 36 and passed the same, as shown in Fig. 7. A radius 45 is provided at the free end of the reverse-bend portion which is intended to follow the pin ends when, as a result of the relative thickness of the parts to be attached, it is necessary that the pin ends be turned to full closed position against the ears 39 in order to draw the parts tightly together.

In operation of the fastener device embodying my second form of socket member rotation of the stud unit causes the pin ends to engage the reverse-bend portions 43. As a result of this action the portions 42 yield at their junction with the respective attaching portions 41 so as to form substantially obtuse angles with the portions 41, as shown in Fig. 8, and at the same time the reverse-bend portions yield at the loop 44 and expand outwardly substantially in the direction of the respective portions 42 so as to decrease the angle between the same. When the pin ends have passed those points at which the reverse-bend portions 43 are in maximum expansion the reverse-bend portions 43 tend to return toward normal shape and force the pin ends into locked position against the inclined surfaces 38. Thus, it will be seen that in my second form the arms 40 yield at two places along their respective lengths whereby they have increased flexibility which may result in a better action and a more durable fastener. Although in the two forms of devices hereinabove described I have shown the pins 29 of the stud unit abutting the respective stops 18 and 39 when the parts of the device are in full fastened position, it is understood that the parts cooperate to effect a good locking action if, due to a greater combined thickness of the plates 2 and 4, the pin ends fetch up tightly against the inclined surfaces short of the stops.

Referring to the third form of my invention illustrated in Figs. 10–16, the socket member is formed of one piece of metal and is generally similar in construction and operation to the two forms which have been described. The chief difference between my third form and the two previous forms is in the construction of the plate element which instead of being rigid, as in my first two forms, is slightly flexible so as to operate in combination with the stud unit to secure plates firmly together which vary substantially in thickness.

Figure 15:
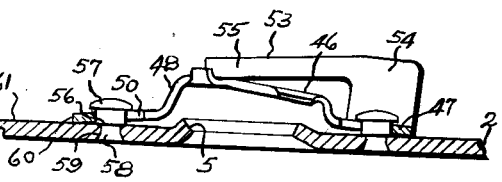
Fig. 15 is a view similar to Fig. 13, but showing the action of my improved device when used with supporting plates having a combined thickness less than the plates shown in Fig. 13.
Figure 16:
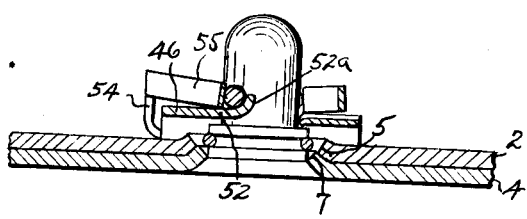
Fig. 16 is a section taken along the line 16—16 of Fig. 11.

Referring in detail to my third form of socket member, I have shown one providing a plate element 46 which is normally slightly bowed in longitudinal cross-sectional configuration, as shown in Fig. 15. The plate element 46 has end portions 47 at opposed longitudinal ends and a raised element 48 intermediate the end portions. The raised element 48 has a central opening 49 and slots 50 providing continuations of the central opening and extending toward the longitudinal ends of the plate element. The plate element has locking surfaces on opposed sides of the central opening, each of which comprises an inclined surface 51 extending from a low point adjacent one of the slots 50 and a generally flat surface 52 forming a continuation of the inclined surface and disposed at a high point adjacent the other slot 50. Ears 52ª project upwardly from the flat surfaces 52 adjacent the slots 50, providing stops to limit rotation of the stud unit. My third form of fastener has locking arms 53 formed of one piece with the plate element. The arms 53 have attaching portions 54 integrally joined to the plate element at diagonally opposed points on the longitudinal sides of the plate element and spring portions 55 extending from the attaching portions 54 in superposed relation to the plate element and normally substantially tangent to the central opening 49 (Fig. 10) so as to be engaged by the pin ends 31 of the stud unit when the same is rotated.

The socket member is secured to the supporting plate 2 by rivets having shanks 56 extending through the slots 50 and plate 2, each of the rivets having a head 57 at one end of the shank in superposed relation to the plate element 46 and a head 58 at an opposite end of the shank received within a countersunk hole 59 of the supporting plate, as shown in Fig. 15. When my third form of socket member is secured in assembly with the plate 2, as shown in Fig. 15, the outermost edges 60 of the end portions 47 abut the inner surface 61 of the plate 2 and, as a result of the bowed shape of the plate element, portions of the end portions 47 adjacent the center of the plate element are spaced from the surface 61 of the plate. As a result of this construction the plate element may yield or flatten down to compensate for variations in the thicknesses of the supporting plates to be secured together.

Thus in operation of my third form of socket member when the stud unit is rotated the pin ends 31 ride up the inclined surfaces 51 at the same time expanding the spring portions 55. When the combined width of the supporting plates 2 and 4 is relatively great, engagement of the pin ends with the inclined surfaces causes the plate element to flatten down so as to move the end portions 47 into flat, abutting relation with the surface 61 of the supporting plate 2. Rotation of the stud unit is continued until the pin ends ride up upon the flat surfaces 52 of the plate element, at which time they have passed those points providing maximum expansion of the spring portions 53 and are held on the flat surfaces 52 by the free ends of the portions 55, as shown most clearly in Figs. 11, 12, 13 and 16. When the socket member is used with plates of predetermined thickness the end portions 47 may enter flat abutting relation with the plate 2 simultaneously with engagement of the pin ends with the flat surfaces 52 of the plate element. Thus the plate element, in spite of its yieldable characteristics, provides a very rigid support for the pin ends when the parts of the installation are finally fastened together. In Fig. 15 I have illustrated the operation of the fastener when the combined thickness of the supporting plates is less than the preferred thickness illustrated in Fig. 13. Thus with the installation shown in Fig. 15 wherein the outer plate 4ª is of less thickness the end portions will not pull down into flat abutting relation with the plate 2 when the parts of the fastener are in fastened relation, but, instead, may be spaced slightly from the plate 2 although pulled down to some extent from the normal spaced position shown in Fig. 14. With the installation shown in Fig. 15 it is apparent that the plate element is not as rigid as when plates having a greater combined thickness are secured together, but, nevertheless, it provides a firm enough support for the pin ends to be satisfactory in most installations.

Although I have illustrated and described preferred embodiments of my invention, I do not wish to be limited thereby because the scope of my invention is best defined by the following claims.

I claim:

1. In a fastener device of the rotary operative type, a plate-like element adapted to be secured to one of the parts to be fastened, said plate-like element having an aperture and a cam surface adjacent said aperture, a rotary member having a shank adapted to pass through the aperture in said plate-like element and having a lateral projection adapted to ride up said cam surface on relative rotation of the parts, and spring means movable laterally relative to the general plane of said plate-like element and cooperating with said projection, said spring means being expanded laterally by said projection during rotation of said rotary member and thereafter tending to contract to hold said projection in fastener engagement with said plate-like element.

2. In a fastener device of the rotary operative type, a plate-like element adapted to be secured to one of the parts to be fastened, said plate-like element having an aperture and a locking surface adjacent said aperture, a rotary member having a shank adapted to pass through the aperture in said plate-like element and having a lateral projection adapted to engage said locking surface on relative rotation of the parts, and a spring arm portion integrally joined to said plate element, said arm being arranged for movement in substantially parallel relation to the general plane of said plate-like element and adapted to engage with said lateral projection to maintain said projection in fastener engagement with said plate-like element.

3. In a sheet metal fastener device of the rotary operative type, a plate-like element adapted to be secured to one of the parts to be fastened, said plate-like element having an aperture and a rigid cam surface adjacent said aperture, a rotary member having a shank adapted to pass through the aperture in said plate-like element and having a lateral projection adapted to engage said cam surface on relative rotation of the parts, and a spring arm portion integrally joined to said plate element, said arm having the plane of one of its flat sides in substantially normal relation to the general plane of said plate-like element, said arm being movable in substantially parallel relation to the general plane of said plate-like element and adapted to engage said projection under tension to maintain said projection in fastener engagement with said plate-like element.

4. In a fastener device of the rotary operative type, a plate-like element having means permitting it to be secured at its ends to one of the parts to be fastened, said plate-like element having an aperture, an inclined surface adjacent said aperture terminating in a substantially flat surface, a rotary member having a shank adapted to pass through the aperture in said plate-like element and having a lateral projection adapted to ride up said inclined surface and be finally positioned on said flat surface on relative rotation of the parts, and a spring portion movable laterally relative to said plate-like element and adapted to cooperate with said lateral projection to maintain said projection in fastener engagement with said plate-like element.

5. In a fastener device of the rotary operative type, a plate-like element adapted to be secured to one of the parts to be fastened, said plate-like element having an aperture and an inclined surface adjacent said aperture, a rotary member having a shank adapted to pass through the aperture in said plate-like element and having a lateral projection adapted to engage said inclined surface on relative rotation of the parts, and a generally S-shaped spring arm portion integrally joined to a marginal edge of said plate element, said arm being movable in substantially parallel relation to the general plane of said plate-like element and adapted to cooperate with said lateral projection to maintain said projection in fastener engagement with said plate-like element.

6. In a fastener device of the rotary operative type, a plate-like element adapted to be secured to one of the parts to be fastened, said plate-like element having an aperture and opposed inclined surfaces adjacent said aperture, a rotary member having a shank adapted to pass through the aperture in said plate-like element, pin-like lateral projections on opposed sides of said shank adapted to engage said inclined surfaces upon relative rotation of the parts, and opposed yieldable portions integral with said plate-like element and movable outwardly on engagement of said projections therewith thereby to hold said parts in engaged relation.

HOWARD J. MURPHY.